US012601949B2

(12) United States Patent
French et al.

(10) Patent No.: US 12,601,949 B2
(45) Date of Patent: Apr. 14, 2026

(54) COLOR ELECTROPHORETIC DISPLAY

(71) Applicant: E Ink Holdings Inc., Hsinchu (TW)

(72) Inventors: Ian French, Hsinchu (TW); Po-Yuan Lo, Hsinchu (TW); Liang-Yu Lin, Hsinchu (TW)

(73) Assignee: E Ink Holdings Inc., Hsinchu (TW)

( * ) Notice: Subject to any disclaimer, the term of this patent is extended or adjusted under 35 U.S.C. 154(b) by 558 days.

(21) Appl. No.: 18/058,775

(22) Filed: Nov. 25, 2022

(65) Prior Publication Data

US 2023/0213833 A1    Jul. 6, 2023

(30) Foreign Application Priority Data

Jan. 4, 2022    (TW) .................................. 111100187

(51) Int. Cl.
*G02F 1/167* (2019.01)
*G02F 1/1335* (2006.01)
*G02F 1/1677* (2019.01)

(52) U.S. Cl.
CPC ............ *G02F 1/167* (2013.01); *G02F 1/1677* (2019.01); *G02F 1/133514* (2013.01)

(58) Field of Classification Search
CPC ..... G02F 1/167; G02F 1/1677; G02F 1/33514
USPC ........................................... 359/296
See application file for complete search history.

(56) References Cited

U.S. PATENT DOCUMENTS

| | | | |
|---|---|---|---|
| 8,902,153 B2 | 12/2014 | Bouchard et al. | |
| 10,349,015 B2 | 7/2019 | Fossum et al. | |
| 10,764,521 B2 | 9/2020 | Usui et al. | |
| 2021/0286115 A1* | 9/2021 | French ................... | G02B 5/201 |

FOREIGN PATENT DOCUMENTS

| | | | |
|---|---|---|---|
| CN | 103345887 A | 10/2013 | |
| CN | 106371254 A | 2/2017 | |
| CN | 106647061 A | 5/2017 | |
| CN | 107065362 A | 8/2017 | |
| CN | 109477919 A | 3/2019 | |
| JP | 2021-51296 A | 4/2021 | |
| TW | 201209497 A | * 3/2012 | ......... C04B 35/4682 |
| TW | 202134750 A | 9/2021 | |

OTHER PUBLICATIONS

The office action of corresponding TW application No. 111100187 issued on Dec. 2, 2022.
The office action of corresponding CN application No. 202210001649.X issued on Dec. 9, 2025.

* cited by examiner

*Primary Examiner* — Michael H Caley

(74) *Attorney, Agent, or Firm* — CKC & Partners Co., LLC

(57) ABSTRACT

The color electrophoretic display includes a display region, a pixel array, a display medium layer, and a color filter array. The display region includes multiple sub-pixel regions. The pixel array corresponds to the display region in position. The display medium layer is located on the pixel array. The color filter array is located on the display medium layer. The color filter array includes multiple color resists. A portion of the color resists include a first pixel fill factor, another portion of the color resists include a second pixel fill factor, the second pixel fill factor is smaller than the first pixel fill factor, and the first pixel fill factor and the second pixel fill factor are smaller than 60%.

13 Claims, 4 Drawing Sheets

COLOR ELECTROPHORETIC DISPLAY

CROSS-REFERENCE TO RELATED APPLICATION

This application claims priority to Taiwan Application Serial Number 111100187, filed Jan. 4, 2022, which is herein incorporated by reference in its entirety.

BACKGROUND

Field of Invention

The present invention relates to a color electrophoretic display.

Description of Related Art

A printed color filter layer is use to filter the light reflected by the display medium layer so as to form the color image in a color electrophoretic display nowadays. However, when the pixel fill factor of the color resists is too high, color mixing problem caused by adjacent two of the color resists may occur easily. When the pixel fill factor of the color resists is too low, the color performance of the color electrophoretic display may be affected.

Accordingly, it is still a development direction for the industry to provide a color filter array which can solve the problems mentioned above.

SUMMARY

The disclosure provides a color electrophoretic display.

In some embodiments, the color electrophoretic display includes a display region, a pixel array, a display medium layer, and a color filter array. The display region includes multiple sub-pixel regions. The pixel array corresponds to the display region in position. The display medium layer is located on the pixel array. The color filter array is located on the display medium layer. The color filter array includes multiple color resists. A portion of the color resists include a first pixel fill factor, another portion of the color resists include a second pixel fill factor, the second pixel fill factor is smaller than the first pixel fill factor, and the first pixel fill factor and the second pixel fill factor are smaller than 60%.

In some embodiments, the first pixel fill factor is in a range from 40% to 60%, and the second pixel fill factor is in a range from 30% to 50%.

In some embodiments, the color resists include a first color resist and a second color resist arranged along a first direction and each has a first color, and a third color resist and a fourth color resist arranged along the first direction and each has a second color different form the first color. The first color resist and the fourth color resist have the first pixel fill factor, and the second color resist and the third color resist have the second pixel fill factor.

In some embodiments, the second color resist is adjacent to the third color resist, and the second color resist and the third color resist are located between the first color resist and the fourth color resist.

In some embodiments, the second color resist is located between the third color resist and the fourth color resist, and the second color resist is adjacent to the fourth color resist.

In some embodiments, the color resists include a fifth color resist and a sixth color resist each having a third color, the third color is different form the first color and the second color, and the first color resist, the second color resist, the third color resist, and the fourth color resist are located between the fifth color resist and the sixth color resist.

In some embodiments, areas of the fifth color resist and the sixth color resist are greater than areas of the first color resist, the second color resist, the third color resist, and the fourth color resist.

In some embodiments, a reflectance of the fifth color resist and the sixth color resist are greater than a reflectance of the first color resist, the second color resist, the third color resist, and the fourth color resist.

In some embodiments, the color resists include a fifth color resist having a third color and the first pixel fill factor, and a sixth color resist each having the third color and the second pixel fill factor. The third color is different form the first color and the second color. The fifth color resist and the sixth color resist are arranged along the first direction.

In some embodiments, the second color resist and the third color resist are located between the first color resist and the fourth color resist, the fifth color resist is adjacent to the second color resist and the third color resist, and the fifth color resist is located between the second color resist and the third color resist.

Another perspective of the disclosure provides a color electrophoretic display.

In some embodiments, the color electrophoretic display includes a display region, a pixel array, a display medium layer, and a color filter array. The display region includes multiple sub-pixel regions. The pixel array corresponds to the display region in position. The display medium layer is located on the pixel array. The color filter array is located on the display medium layer. The color filter array includes a first color resist and a second color resist arranged along a first direction and each has a first color, and a third color resist and a fourth color resist arranged along the first direction and each has a second color different form the first color. The first color resist and the fourth color resist have the first pixel fill factor, and the second color resist and the third color resist have a second pixel fill factor different from the first pixel fill factor.

In some embodiments, the first pixel fill factor is in a range from 40% to 60%, and the second pixel fill factor is in a range from 30% to 50%.

In some embodiments, an area of each of the first color resist and the second color resist corresponds to an area of one of the sub-pixel regions.

In some embodiments, an area of each of the third color resist and the fourth color resist corresponds to an area of one of the sub-pixel regions.

In some embodiments, the color filter array further includes a fifth color resist having a third color and the first pixel fill factor, and a sixth color resist each having the third color and the second pixel fill factor. The third color is different form the first color and the second color. The fifth color resist and the sixth color resist are arranged along the first direction.

In some embodiments, an area of each of the fifth color resist and the sixth color resist corresponds to an area of two of the sub-pixel regions.

In the aforementioned embodiments, since the pixel fill factor of the color resists are smaller than 60%, the color mixing problem due to the tolerance in color resist printing process can be avoided by using color resists with different pixel fill factors, and the color performance of the color electrophoretic display can be maintained.

BRIEF DESCRIPTION OF THE DRAWINGS

The invention can be more fully understood by reading the following detailed description of the embodiment, with reference made to the accompanying drawings as follows.

DETAILED DESCRIPTION

Figure 1:
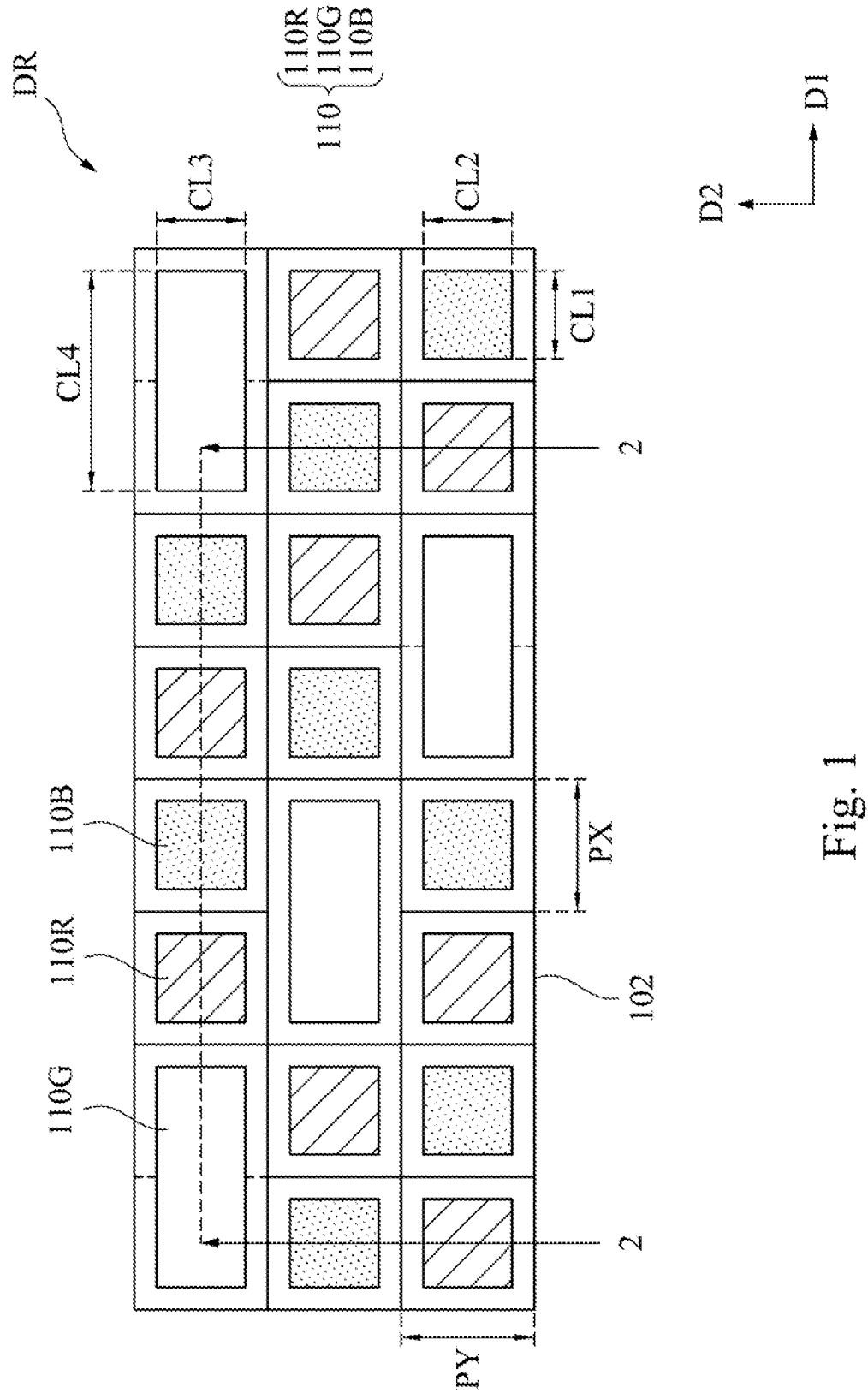
FIG. 1 is a top view of a color electrophoretic display according to one embodiment of the present disclosure.

Reference will now be made in detail to the present embodiments of the invention, examples of which are illustrated in the accompanying drawings. Wherever possible, the same reference numbers are used in the drawings and the description to refer to the same or like parts.

Figure 2:
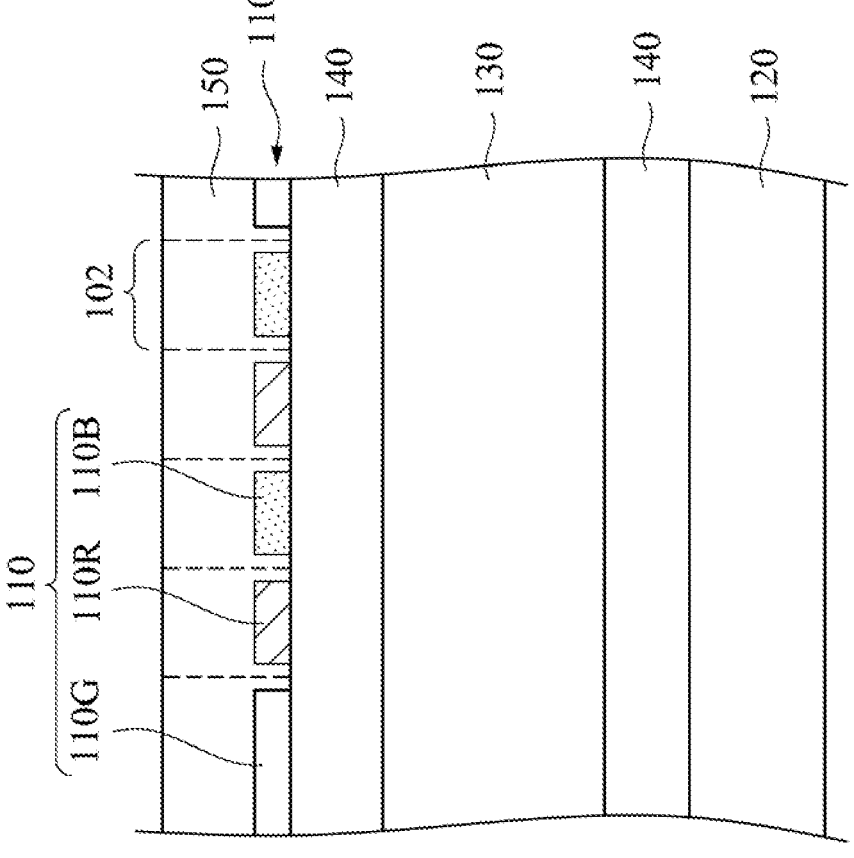
FIG. 2 is a cross-sectional view taken along line 2-2 in FIG. 1.

FIG. 1 is a top view of a color electrophoretic display 100 according to one embodiment of the present disclosure. FIG. 2 is a cross-sectional view taken along line 2-2 in FIG. 1. Reference is made to FIG. 1 and FIG. 2. The color electrophoretic display 100 includes a color filter array 110, a pixel array 120, and a display medium layer 130. The display medium layer 130 is located on the pixel array 120. The color electrophoretic display 100 has a display region DR, and the display region DR includes multiple sub-pixel regions 102. The pixel array 120 corresponds to the sub-pixel regions 102 of the display region DR. In the present embodiment, the first direction D1 is a horizontal direction, and the second direction D2 is a vertical direction. The first direction D1 is perpendicular to the second direction D2.

As shown in FIG. 2, the color electrophoretic display 100 includes two adhesive layers 140 and a transparent substrate 150. The adhesive layers 140 are located between the pixel array 120 and the display medium layer 130 and between the color filter array 110 and the display medium layer 130. The transparent substrate 150 is located on the color filter array 110. The structural configuration between the aforementioned color filter array 110 and the display medium layer 130 can be changed depends on the practical requirements, and the present disclosure is not limited thereto. For clarity, the transparent substrate 150 is omitted in FIG. 1.

As shown in FIG. 1, the color filter array 110 includes multiple color resists. In the present embodiment, color resists having red color, blue color, and green color are used as examples, but the present disclosure is not limited thereto. The color filter array 110 includes red color resists 110R, blue color resists 110B, and green color resists 110G. Each of the sub-pixel regions 102 has a length PX and a width PY. Each of the blue color resists 1108 has a length CL1 and a width CL2, and the pixel fill factor of the blue color resist 1108 is an area of the blue color resist 1108 over an area of one of the sub-pixel regions 102. Similarly, the pixel fill factor of each of the red color resist 110R is an area of the red color resist 110R over the area of one of the sub-pixel regions 102. In the present embodiment, each of the green color resists 110G has a length CL4 and a width CL3, and the pixel fill factor of the green color resist 110G is a product of the length CL4 and the width CL3 over an areas of two of the sub-pixel regions 102. In the present embodiment, the pixel fill factor of the color resists is smaller than 60% so as to avoid color mixing problem caused by the tolerance in color resist printing process.

Figure 3:
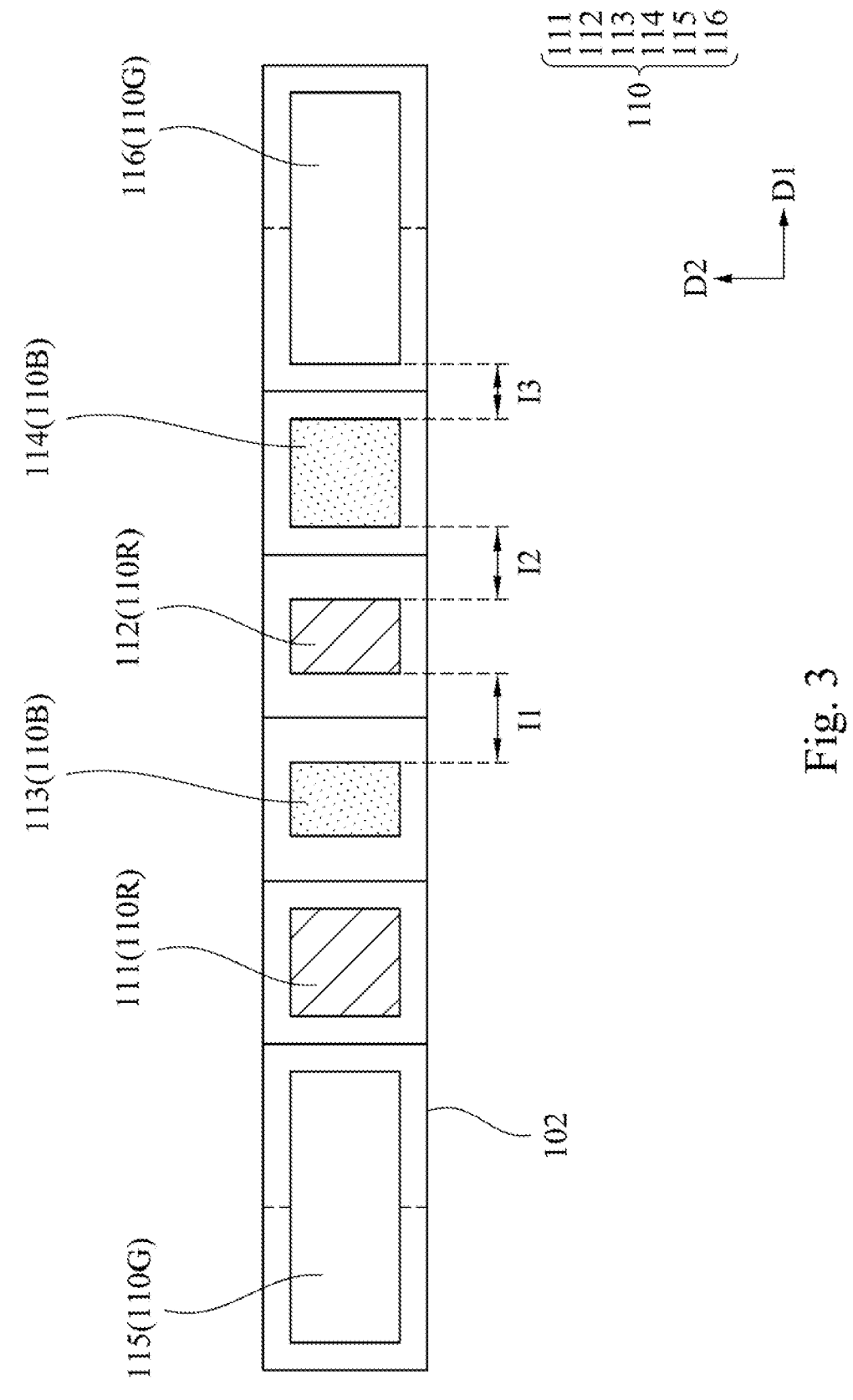
FIG. 3 is a partially enlarged view of the color electrophoretic display in FIG. 1.

FIG. 3 is a partially enlarged view of the color electrophoretic display 100 in FIG. 1. The pixel fill factors of a portion of the red color resists 110R, the blue color resists 110B, and the green color resists 110G are in a range from 40% to 60%. The pixel fill factors of another portion of the red color resists 110R, the blue color resists 110B, and the green color resists 110G are in a range from 30% to 50%. In other words, color resists of each colors include two portions that have different pixel fill factors.

As shown in FIG. 3, in the present embodiment, the color resists include a first color resists 111, a second color resist 112, a third color resist 113, and a fourth color resist 114. The first color resist 111 and the second color resist 112 are red color resists 110R, the third color resist and the fourth color resist are blue color resists 1108. The first color resist 111, the second color resist 112, the third color resist 113, and the fourth color resist 114 are arranged along the first direction D1.

The first color resist 111 and the fourth color resist 114 have the second pixel fill factor, and 50% is demonstrated in the present embodiment as an example. The second color resist 112 and the third color resist 113 have the first pixel fill factor, and 40% is demonstrated in the present embodiment as an example. In other words, the pixel fill factor of the second color resist 112 and the third color resist 113 in the present embodiment are smaller than the pixel fill factor of the first color resist 111 and the fourth color resist 114. In addition, areas of the first color resist 111, the second color resist 112, the third color resist 113, and the fourth color resist 114 of the present embodiment are smaller than an area of one of the sub-pixel regions 102.

The second color resist 112 is adjacent to the third color resist 113, and the second color resist 112 and the third color resist 113 are located between the first color resist 111 and the fourth color resist 114. The second color resist 112 is adjacent to the fourth color resist 114, and the second color resist 112 is located between the third color resist 113 and the fourth color resist 114. That is, the second color resist 112 and the third color resist 113 that have smaller pixel fill factor are located between the first color resist 111 and the fourth color resist 114 that have greater pixel fill factor.

Using the electrophoretic display having a resolution of 300 dpi as an example, the length PX and the width PY of the sub-pixel region 102 are about 84.5 um. The resolution limitation of the color resist printing process is about 26.26 um. As shown in FIG. 3, the second color resist 112 and the third color resist 113 that have smaller pixel fill factor have an interval I1 therebetween, and the interval I1 is about 40.22 um. The second color resist 112 and the fourth color resist 114 have an interval 12 therebetween, and the interval 12 is about 33.24 urn. In other words, the interval I1 and the interval 12 are greater than the resolution limitation of the color resist printing process, and therefore such configuration can avoid the color mixing problem.

In the present embodiment, the color resists include a fifth color resist 115 and a sixth color resist 116. The fifth color resist 115 and the sixth color resist 116 are green color resists 110G. The first color resist 111, the second color resist 112, the third color resist 113, and the fourth color resist 114 are located between the fifth color resist 115 and sixth color resist 116. The fourth color resist 114 and the sixth color resist 116 have an interval 13 therebetween, and the interval 13 is about 40.29 urn. In the present embodiment, the green color resists 110G with greater reflectance have greater areas, and the red color resists 110R and the blue color resists 1108 with smaller reflectance have smaller areas. As such, the textures that can be seen by human eye caused by the color resists with smaller reflectance can be avoided. Accordingly, the interval 13 between the fourth color resists 114 having pixel fill factor of 50% and the sixth color resists 116 with greater areas is greater than the resolution limitation of the color resist printing process.

Table one is relations between the pixel fill factor and the performance of the color filter array of the color electrophoretic display 100 of the present disclosure and the color electrophoretic displays with different configurations. The control group one represents a color electrophoretic display whose pixel fill factors of the red color resists and the blue color resists are both 40%. The control group two represent a color electrophoretic display whose pixel fill factors of the red color resists and the blue color resists are both 50%. As shown in table one, the present disclosure and the control group one have no color mixing problems, and the NTSC color performance of the present disclosure can be improved from 1.98% to 2.53%. The control group two has color mixing problem, although the color performance is better due to greater pixel fill factor.

TABLE ONE

| | Relation between the pixel fill factor and performance of the color filter array | | |
|---|---|---|---|
| | Pixel fill factor (%) | NTSC Color performance (%) | Color mixing |
| Control group 1 | 40% | 1.98 | No |
| Control group 2 | 50% | 2.73 | Yes |
| Present disclosure | 40%/50% | 2.53 | No |

Figure 4:
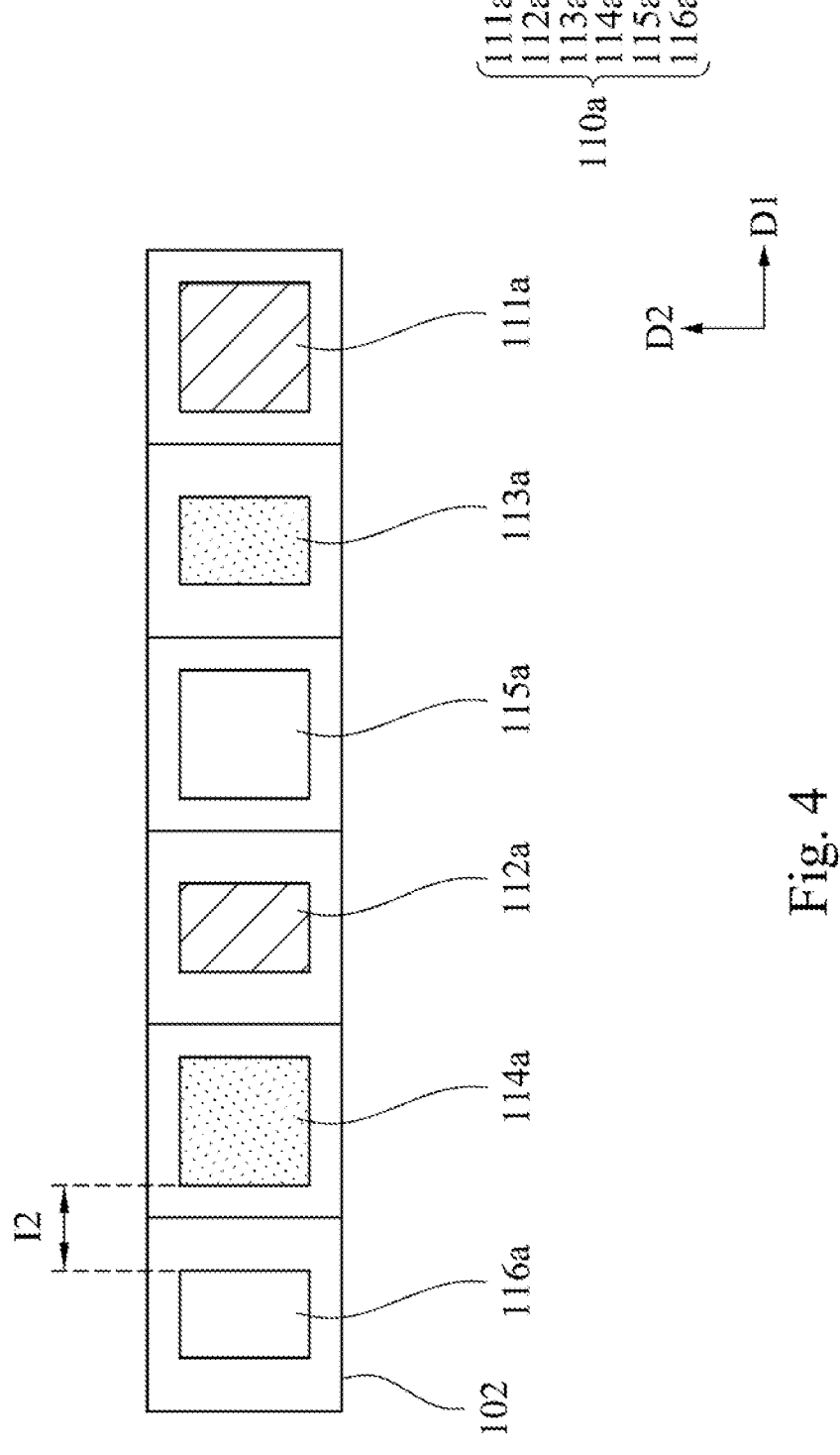
FIG. 4 is a top view of another color electrophoretic display according to one embodiment of the present disclosure.

FIG. 4 is a top view of another color electrophoretic display according to one embodiment of the present disclosure. The color filter array 110a of the present disclosure include a first color resist 111a, a second color resist 112a, a third color resist 113a, a fourth color resist 114a, a fifth color resist 115a, and a sixth color resist 116a. In the present embodiment, the first color resist 111a and the second color resist 112a are red color resists 110R. The third color resist 113a and the fourth color resist 114a are blue color resists 110B. The fifth color resist 115a and the sixth color resist 116a are green color resists 110G. The first color resist 111a, the fourth color resist 114a, and the fifth color resist 115a have the first pixel fill factor, and 50% is demonstrated in the present embodiment as an example. The second color resist 112a, the third color resist 113a, and the sixth color resist 116a have the second pixel fill factor, and 40% is demonstrated in the present embodiment as an example.

The fifth color resist 115a is adjacent to the second color resist 112a and the third color resist 113a, and the fifth color resist 115a is located between the second color resist 112a and the third color resist 113a. The second color resist 112a and the third color resist 113a are located between the first color resist 111a and the fourth color resist 114a. The fourth color resist 114 is located between the second color resist 112a and the sixth color resist 116a. In the present embodiment, the color resists that have greater pixel fill factor and the color resists that have smaller pixel fill factor are alternatively distributed. The fourth color resist 114a that has blue color and the sixth color resist 116a that has green color have the interval 12 therebetween as well, and the interval 12 is greater than the resolution limitation of the color resist printing process. Therefore, by alternatively distribute the color resists with different pixel fill factors, the color mixing problem can be avoided and the color performance of the color electrophoretic display 100 can be maintained.

In summary, since the pixel fill factor of the color resists are smaller than 60%, the color mixing problem due to the tolerance in color resist printing process can be avoided by using color resists with different pixel fill factors, and the color performance of the color electrophoretic display can be maintained. In addition, the interval between adjacent tow color resists can be greater than the resolution limitation of the color resist printing process by disposing the color resists having smaller pixel fill factor between the color resists having greater pixel fill factor, and therefore the color mixing problem can be avoided.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A color electrophoretic display, comprising:
   a display region comprising a plurality of sub-pixel regions;
   a pixel array corresponds to the display region in position;
   a display medium layer located on the pixel array; and
   a color filter array located on the display medium layer, wherein the color filter array comprises a plurality of color resists, a portion of the color resists comprises a first pixel fill factor, another portion of the color resists comprises a second pixel fill factor, the second pixel fill factor is smaller than the first pixel fill factor, the first pixel fill factor and the second pixel fill factor are smaller than 60%, and the color resists comprise:
      a first color resist and a second color resist arranged along a first direction and each has a first color; and
      a third color resist and a fourth color resist arranged along the first direction and each has a second color different from the first color;
      wherein the first color resist and the fourth color resist have the first pixel fill factor, and the second color resist and the third color resist have the second pixel fill factor, the second color resist is adjacent to the third color resist, and the second color resist and the third color resist are located between the first color resist and the fourth color resist.

2. The color electrophoretic display of claim 1, wherein the first pixel fill factor is in a range from 40% to 60%, and the second pixel fill factor is in a range from 30% to 50%.

3. The color electrophoretic display of claim 1, wherein the second color resist is located between the third color resist and the fourth color resist, and the second color resist is adjacent to the fourth color resist.

4. The color electrophoretic display of claim 1, wherein the color resists further comprise:
   a fifth color resist and a sixth color resist each having a third color, the third color is different from the first color and the second color, and the first color resist, the second color resist, the third color resist, and the fourth color resist are located between the fifth color resist and the sixth color resist.

5. The color electrophoretic display of claim 4, wherein areas of the fifth color resist and the sixth color resist are greater than areas of the first color resist, the second color resist, the third color resist, and the fourth color resist.

6. The color electrophoretic display of claim 4, wherein a reflectance of the fifth color resist and the sixth color resist are greater than a reflectance of the first color resist, the second color resist, the third color resist, and the fourth color resist.

7. The color electrophoretic display of claim 1, wherein the color resists further comprise:

a fifth color resist having a third color and the first pixel fill factor, and the third color is different from the first color and the second color; and a sixth color resist each having the third color and the second pixel fill factor, wherein the fifth color resist and the sixth color resist are arranged along the first direction.

8. The color electrophoretic display of claim 7, wherein the second color resist and the third color resist are located between the first color resist and the fourth color resist, the fifth color resist is adjacent to the second color resist and the third color resist, and the fifth color resist is located between the second color resist and the third color resist.

9. A color electrophoretic display, comprising:

a display region comprising a plurality of sub-pixel regions;

a pixel array corresponds to the display region in position;

a display medium layer located on the pixel array; and a color filter array located on the display medium layer, wherein the color filter array comprises:

a first color resist and a second color resist arranged along a first direction and each has a first color; and a third color resist and a fourth color resist arranged along the first direction and each has a second color different from the first color;

wherein the first color resist and the fourth color resist have a first pixel fill factor, the second color resist and the third color resist have a second pixel fill factor different from the first pixel fill factor, and an area of each of the first color resist and the second color resist corresponds to an area of one of the sub-pixel regions, the third color resist is located between the second color resist and the fourth color resist, and an interval between the second color resist and the third color resist along the first direction is greater than an interval between the third color resist and the fourth color resist along the first direction.

10. He color electrophoretic display of claim 9, wherein the first pixel fill factor is in a range from 40% to 60%, and the second pixel fill factor is in a range from 30% to 50%.

11. The color electrophoretic display of claim 9, wherein an area of each of the third color resist and the fourth color resist corresponds to an area of one of the sub-pixel regions.

12. The color electrophoretic display of claim 9, wherein the color filter array further comprises:

a fifth color resist having a third color and the first pixel fill factor, and the third color is different from the first color and the second color; and a sixth color resist each having the third color and the second pixel fill factor, wherein the fifth color resist and the sixth color resist are arranged along the first direction.

13. The color electrophoretic display of claim 12, wherein an area of each of the fifth color resist and the sixth color resist corresponds to an area of two of the sub-pixel regions.

* * * * *